US012330918B2

(12) United States Patent
Babu

(10) Patent No.: US 12,330,918 B2
(45) Date of Patent: Jun. 17, 2025

(54) SPLIT UNIT WITH REDUCED HEADROOM ASSEMBLY FOR A PNEUMATIC VACUUM ELEVATOR

(71) Applicant: Killakathu Ramanathan Babu, Chennai (IN)

(72) Inventor: Killakathu Ramanathan Babu, Chennai (IN)

(73) Assignee: Killakathu Ramanathan Babu (IN)

( * ) Notice: Subject to any disclaimer, the term of this patent is extended or adjusted under 35 U.S.C. 154(b) by 0 days.

(21) Appl. No.: 18/577,299

(22) PCT Filed: Jul. 11, 2022

(86) PCT No.: PCT/IB2022/056378
§ 371 (c)(1),
(2) Date: Jan. 8, 2024

(87) PCT Pub. No.: WO2023/002298
PCT Pub. Date: Jan. 26, 2023

(65) Prior Publication Data

US 2024/0359949 A1 Oct. 31, 2024

(30) Foreign Application Priority Data

Jul. 22, 2021 (IN) ............................ 202141032977

(51) Int. Cl.
*B66B 9/04* (2006.01)

(52) U.S. Cl.
CPC .................................... *B66B 9/04* (2013.01)

(58) Field of Classification Search
CPC ....................................................... B66B 9/04
See application file for complete search history.

(56) References Cited

U.S. PATENT DOCUMENTS

| | | | | | |
|---|---|---|---|---|---|
| 6,085,873 | A * | 7/2000 | Macchi | B65G 51/04 187/400 |
| 10,106,375 | B1 * | 10/2018 | Ascua | B66B 9/04 |
| 2014/0131140 | A1 * | 5/2014 | Verde | B66B 9/04 187/250 |
| 2014/0238781 | A1 * | 8/2014 | Ascua | B66B 9/04 187/250 |
| 2018/0065750 | A1 * | 3/2018 | Brown | B64D 11/04 |
| 2019/0106293 | A1 | 4/2019 | Ascua et al. | |
| 2022/0009747 | A1 * | 1/2022 | Alexanian | E04C 2/02 |

FOREIGN PATENT DOCUMENTS

CN 104401851 A 2/2017

* cited by examiner

*Primary Examiner* — Diem M Tran
(74) *Attorney, Agent, or Firm* — Jason C. Cameron

(57) ABSTRACT

An assembly for a pneumatic elevator is provided. The assembly includes a top cylinder housed at a top surface of a vertically stacked elevator cylinder; a control panel box is mounted to a chamber unit, wherein the chamber unit is inbuilt with a split top plate assembly, wherein the chamber unit is operatively coupled to an outer surface of the top cylinder toward a supporting wall. The split top plate assembly includes a split top plate coupled to a top portion of the elevator cylinder. The split top plate assembly also includes a plurality of support tube operatively coupled to an upper surface of the split top plate. The split top plate assembly also includes an air chamber is operatively coupled to a vacuum chamber, wherein the air chamber is configured for air flow between the vacuum chamber and the air chamber.

8 Claims, 5 Drawing Sheets

SPLIT UNIT WITH REDUCED HEADROOM ASSEMBLY FOR A PNEUMATIC VACUUM ELEVATOR

CROSS-REFERENCE TO RELATED APPLICATION

This application claims priority from a Complete Patent application filed in India having patent application No. 202141032977, filed on Jul. 22, 2021, and titled "A SPLIT UNIT WITH REDUCED HEADROOM ASSEMBLY FOR A PNEUMATIC VACUUM ELEVATOR" and a PCT Application No. PCT/IB2022/056378 filed on Jul. 11, 2022, and titled "A SPLIT UNIT WITH REDUCED HEADROOM ASSEMBLY FOR A PNEUMATIC VACUUM ELEVATOR."

FIELD OF INVENTION

Embodiments of the present disclosure relate to pneumatic vacuum elevator, and more particularly, to a split unit with reduced headroom assembly for the pneumatic elevator.

BACKGROUND

Elevators are typically countervailing weights in order to facilitate a passenger cabin to move up and down an elevator shaft in large buildings or structures. These types of elevators require a great deal of area or space, maintenance cost, large number of equipment and machineries. More recently, a new type of elevator has been developed known as a vacuum elevator system or the pneumatic vacuum elevator, which uses air pressure to cause the motion of the cabin within a thoroughfare or tubular cylinder upon the confines of the cabin. However, since the vacuum elevator place a crucial role in small and constrained places such as houses, the design, arrangement, and the like needs to be considered to make the best use of the space and also the effective working of the pneumatic elevators. In addition, the existing approaches requires more head room height for installation of the elevators. Also, the existing elevators produces more noise during operation.

Hence, there is a need for an improved split unit with reduced headroom assembly for the pneumatic elevator to address the aforementioned issues.

BRIEF DESCRIPTION

In accordance with the present disclosure, an assembly for a pneumatic elevator is provided. The assembly includes a top cylinder housed at a top surface of a vertically stacked elevator cylinder. The top cylinder includes a control panel box is mounted to a chamber unit, wherein the chamber unit is inbuilt with a split top plate assembly, wherein the chamber unit is operatively coupled to an outer surface of the top cylinder toward a wall of a building. The split top plate assembly includes a split top plate coupled to a top portion of the elevator cylinder. The split top plate assembly also includes a plurality of support tube operatively coupled to an upper surface of the split top plate. The split top plate assembly also includes an air chamber operatively coupled to a vacuum chamber, wherein the air chamber is configured for air flow between the vacuum chamber and the air chamber.

In accordance with another embodiment of the present disclosure, a pneumatic vacuum elevator is provided. The pneumatic vacuum elevator includes one or more vertically stacked elevator cylinders configured to enable one or more users to move between a plurality of floors of a multi-storied building. The pneumatic vacuum elevator also includes one or more vertically stacked elevator cylinders comprising a top cylinder, wherein the top cylinder is housed on a top surface of the corresponding one or more vertically stacked elevator cylinders. The top cylinder includes a control panel box is mounted to a chamber unit, wherein the chamber unit is inbuilt with a split top plate assembly, wherein the chamber unit is operatively coupled to an outer surface of the top cylinder toward a wall of a building. The split top plate assembly includes a split top plate coupled to a top portion of the elevator cylinder. The split top plate assembly also includes a plurality of support tube coupled to an upper surface of the split top plate. The split top plate assembly also includes an air chamber is operatively coupled to a vacuum chamber, wherein the air chamber is configured for air flow between the vacuum chamber and the air chamber.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present invention so as not to obscure the figures with details that will be readily apparent to those skilled in the art having the benefit of the description herein.

DETAILED DESCRIPTION

For the purpose of promoting an understanding of the principles of the invention, reference will now be made to the embodiment illustrated in the figures and specific language will be used to describe them. It will nevertheless be understood that no limitation of the scope of the invention is thereby intended. Such alterations and further modifications in the illustrated system, and such further applications of the principles of the invention as would normally occur to those skilled in the art are to be construed as being within the scope of the present invention.

It will be understood by those skilled in the art that the foregoing general description and the following detailed description are exemplary and explanatory of the invention and are not intended to be restrictive thereof.

The terms “comprises”, “comprising”, or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by “comprises . . . a” does not, without more constraints, preclude the existence of other devices, sub-systems, elements, structures, components, additional devices, additional sub-systems, additional elements, additional structures or additional components. Appearances of the phrase “in an embodiment”, “in another embodiment” and similar language throughout this specification may, but not necessarily do, all refer to the same embodiment.

Unless otherwise defined, all technical and scientific terms used herein have the same meaning as commonly understood by those skilled in the art to which this invention belongs. The system, methods, and examples provided herein are only illustrative and not intended to be limiting.

Embodiments of the present disclosure relates to an assembly for a pneumatic elevator. As used herein, the term ‘pneumatic elevator’ is a type of elevator which uses air pressure to cause the motion of the cabin within a thoroughfare or tubular cylinder that uses the air within the elevator as a form of air upon the confines of the cabin.

Figure 1A:
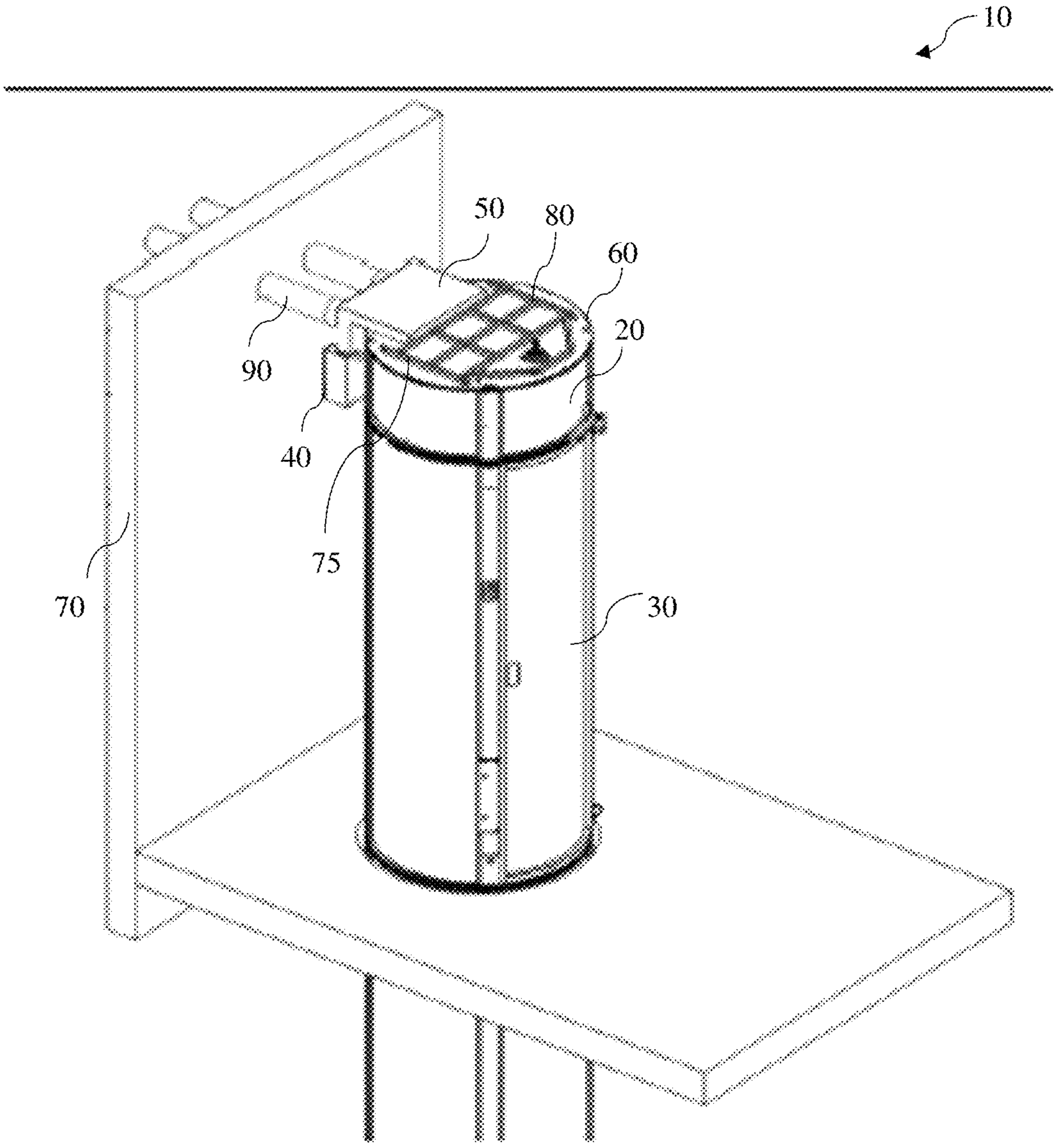
FIG. 1*a* and FIG. 1*b* are schematic representation of an overall pneumatic vacuum elevator system comprising a split unit with reduced headroom assembly in accordance with an embodiment of the present disclosure.
Figure 1B:
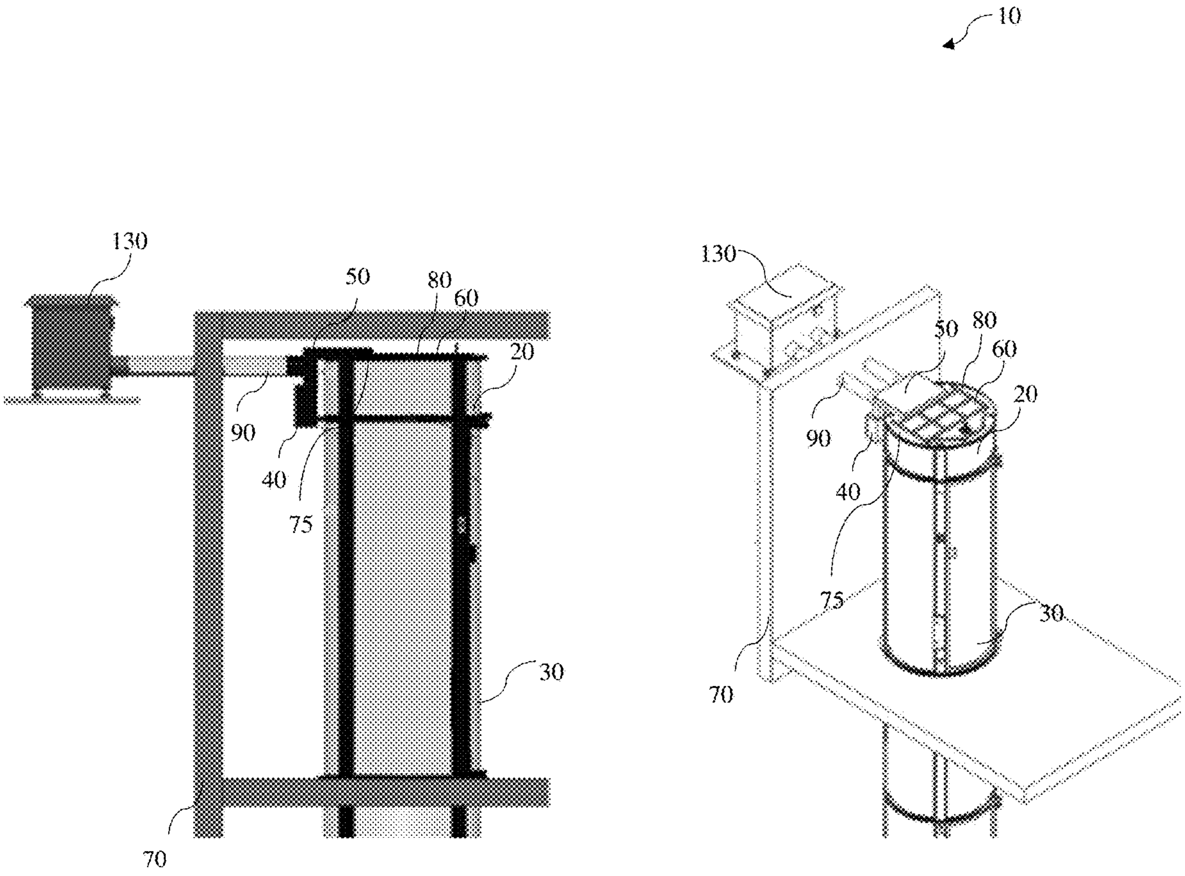

FIG. 1*a* and FIG. 1*b* are schematic representation of an overall pneumatic vacuum elevator system 10 comprising a split unit with reduced headroom assembly in accordance with an embodiment of the present disclosure. The assembly 10 includes a top cylinder 20 housed at a top surface of one or more vertically stacked elevator cylinders 30. The top cylinder 20 includes a control panel box 40 mounted to a chamber unit 50. The chamber unit 50 is inbuilt with a split top plate assembly 60. The chamber unit 50 is operatively coupled to an outer surface of the top cylinder 20 toward a wall 70 of a building where the pneumatic vacuum elevator is to be housed. In one embodiment, the top cylinder 20 and the elevator cylinder 30 may be operatively coupled to each other via at least one Polyvinyl chloride pipe (PVC) 90. In such embodiment, a pipe may be operatively coupled to the chamber unit 50 for fixing the PVC pipe 90.

Figure 2:
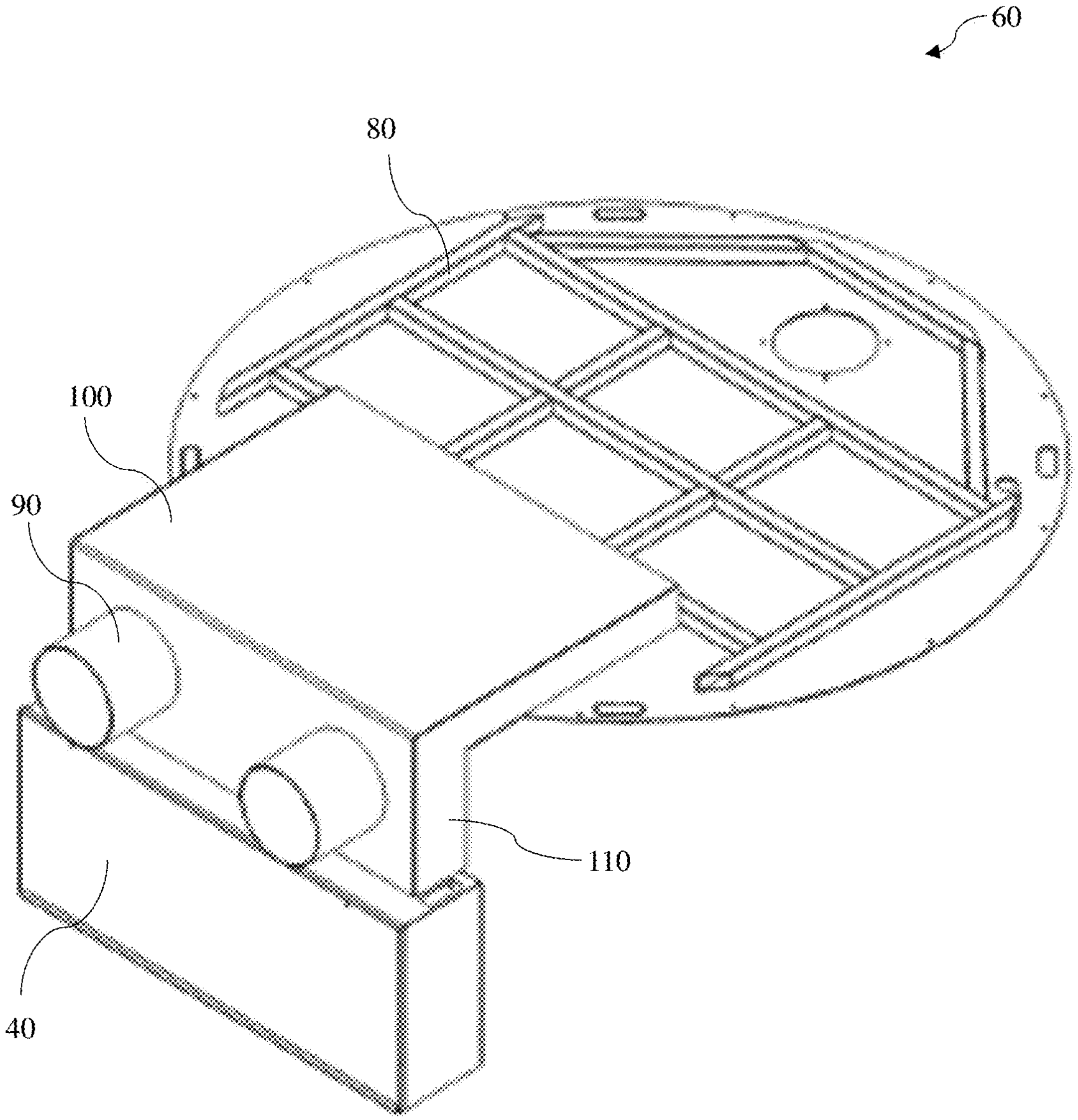
FIG. 2 is a schematic representation of an asserted view of a split top plate structures assembly of FIG. 1*a* and FIG. 1*b* in accordance with an embodiment of the present disclosure.
Figure 3:
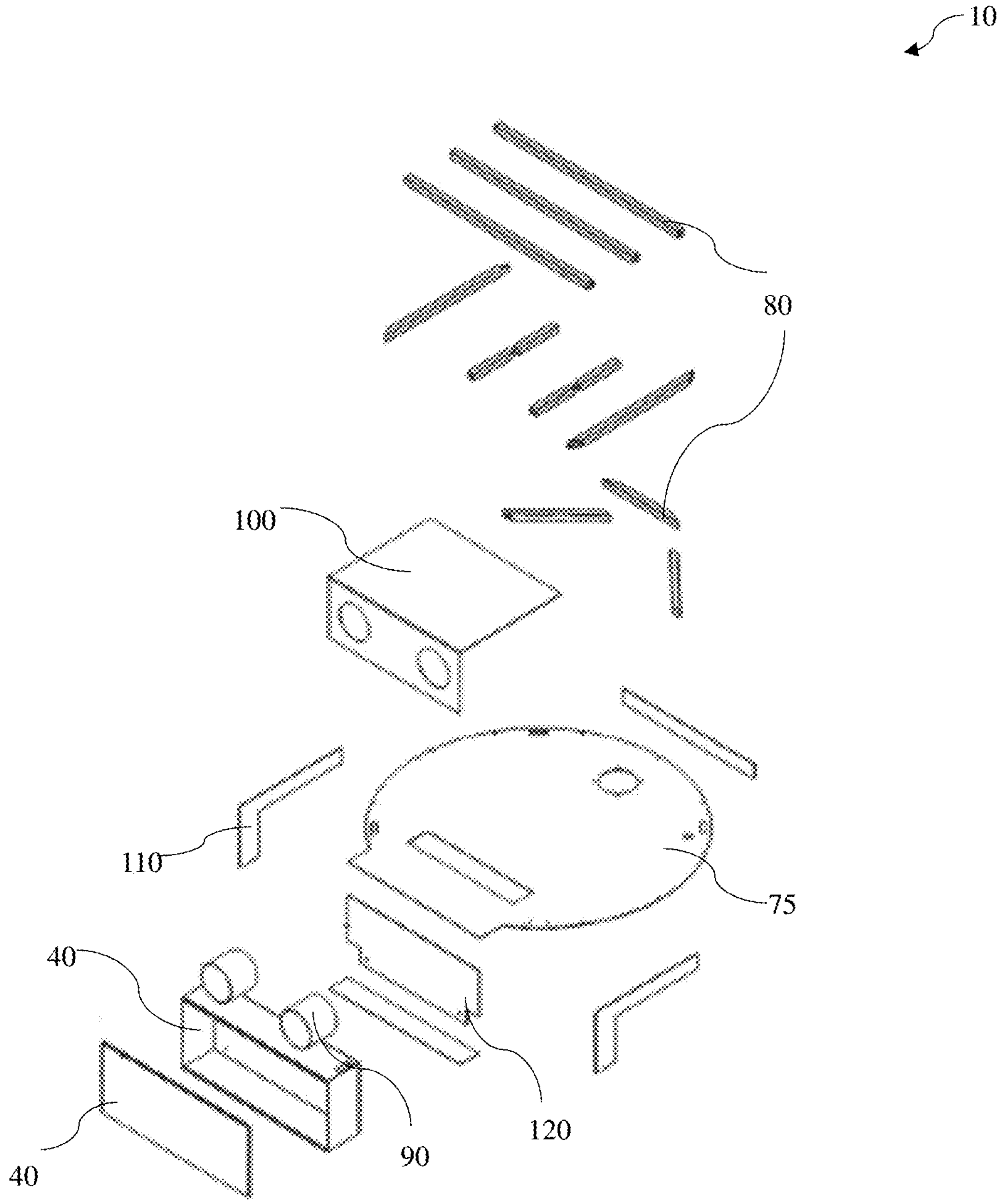
FIG. 3 is a schematic representation of an exploded view of the split top plate structures assembly of FIG. 1*a* and FIG. 1*b* in accordance with an embodiment of the present disclosure.

Furthermore, the assembly includes a split top plate 75 (as shown in FIG. 2 and FIG. 3) operatively coupled to a top portion of the elevator cylinder 30. The split top plate 75 also includes a plurality of support tube 80 operatively couped to an upper surface of the split top plate 75. Furthermore, the split top plate 75 includes a air chamber is operatively coupled to a vacuum chamber. The air chamber is configured for air flow between the vacuum chamber and the air chamber. In one embodiment, the air chamber may include a top frame 100 of a first pre-defined shape placed along a side frame 110 of a second pre-defined shape into the split top plate 75 to create the air chamber for flowing of compressed air. In such embodiment, the first pre-defined shape of the top frame 100 may be an ‘L’ shaped top frame 100. The second pre-defined shape of the side frame 110 comprises an ‘L’ shaped side frame 110.

The air chamber may further include a vertical plate 120 operatively coupled to vacuum chamber to fix the control panel box 40 to the chamber unit 50.

Figure 4:
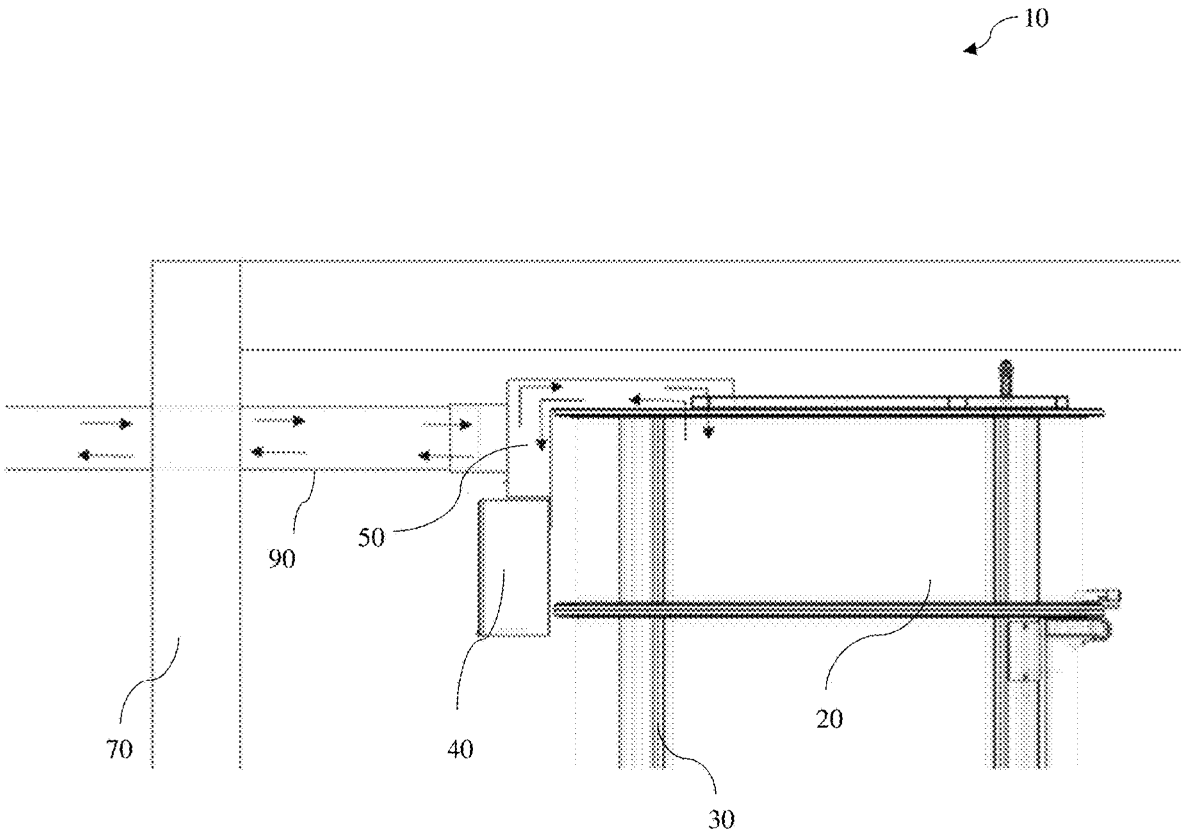
FIG. 4 is a schematic representation of representing air flow in the vacuum elevator system due to reduced top cylinder.

In operation (as shown in FIG. 4), when the cabin is being operated in an ascending direction, that is when the cabin is moving in the upward direction, the air from the top cylinders (20) is sucked by one or more vacuum motors from a split unit placed at a distinct location via the PVC pipes 90. Further the air from the one or more PVC pipes 90 passes through a noise absorption material in the split unit, before reaching atmosphere to reduce the noise generated by the vacuum elevator 10.

Also, in the scenario where the cabin is being operated in a descending direction, that is when the cabin is moving in the downward direction, the air from the atmosphere is allowed into the top cylinder 20 by the control panel box 40 from the split unit via the PVC pipes 90. The air from the atmosphere allowed by the control panel box 40 passes through the noise absorption material to reduce the noise generated by the vacuum elevator 10.

Various embodiments of the disclosure enable the assembly to make the best use of the space and also the effective working of the pneumatic elevators, thereby making the system more reliable and efficient. Also, the disclosed elevator can be fixed in a building having low head space/head room, thereby making the system more reliable in most of the types of building structures including buildings in hilly areas or cold regions with slanted or low head room.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. An assembly 10 for a pneumatic elevator, wherein assembly 10 comprises:

a top cylinder 20 of one or more vertically stacked elevator cylinder 30, wherein the top cylinder 20 comprises:

a control panel box 40 mounted to a chamber unit 50, wherein the chamber unit 50 is inbuilt with a split top plate assembly 60, wherein the chamber unit 50 is operatively coupled to an outer surface of the top cylinder 20 toward a wall 70 of a building, wherein the split top plate assembly 60 comprises:

a split top plate 75 operatively coupled to a top portion of the elevator cylinder 30;

a plurality of support tube 80 operatively coupled to an upper surface of the split top plate 75; and an air chamber is operatively coupled to a vacuum chamber, wherein the air chamber is configured for air flow between the vacuum chamber and the air chamber, wherein the air chamber comprises:

a top frame 100 of a first pre-defined shape placed along a side frame 110 of a second pre-defined shape into the split top plate 75 to create the air chamber for flowing of compressed air; and a vertical plate 120 operatively coupled with vacuum chamber to fix the control panel box 40 to the chamber unit 50.

2. The assembly 10 as claimed in claim 1, wherein the top cylinder 20 and the elevator cylinder 30 are operatively coupled to each other via at least one Polyvinyl chloride pipe (PVC) 90.

3. The assembly 10 as claimed in claim 2, comprising a pipe operatively coupled to the chamber unit 50 for fixing the PVC pipe 90.

4. The assembly 10 as claimed in claim 1, wherein the first pre-defined shape of the top frame 100 comprises an 'L' shaped top frame 100, wherein the second pre-defined shape of the side frame 110 comprises an 'L' shaped side frame 110.

5. A pneumatic vacuum elevator comprising a split unit assembly 10, wherein the split unit assembly 10 comprises:

one or more vertically stacked elevator cylinders 30 configured to enable one or more users to move between a plurality of floors of a multi-storied building;

one or more vertically stacked elevator cylinders 30 comprising a top cylinder 20, wherein the top cylinder 20 is housed at a top surface of the corresponding one or more vertically stacked elevator cylinders 30, wherein the top cylinder 20 comprises:

a control panel box 40 mounted to a chamber unit 50, wherein the chamber unit 50 is inbuilt with a split top plate assembly 60, wherein the chamber unit 50 is operatively coupled to an outer surface of the top cylinder 20 toward a wall 70 of a building, wherein the split top plate assembly 60 comprises:

a split top plate 75 coupled to a top portion of the elevator cylinder 30;

a plurality of support tube 80 operatively coupled to an upper surface of the split top plate 75; and an air chamber is operatively coupled to a vacuum chamber, wherein the air chamber is configured for air flow between the vacuum chamber and the air chamber, wherein the air chamber comprises:

a top frame 100 of a first pre-defined shape placed along a side frame 110 of a second pre-defined shape into the split top plate 75 to create the air chamber for flowing of compressed air; and a vertical plate 120 operatively coupled to vacuum chamber to fix the control panel box 40 to the chamber unit 50.

6. The pneumatic vacuum elevator 10 as claimed in claim 5, wherein the top cylinder 20 and the elevator cylinder 30 are operatively coupled to each other via at least one Polyvinyl chloride pipe (PVC) 90.

7. The pneumatic vacuum elevator 10 as claimed in claim 6, comprising a pipe operatively coupled to the chamber unit 50 for fixing the PVC pipe 90.

8. The pneumatic vacuum elevator 10 as claimed in claim 5, wherein the first pre-defined shape of the top frame 100 comprises an 'L' shaped top frame 100, wherein the second pre-defined shape of the side frame 110 comprises an 'L' shaped side frame 110.

* * * * *